(12) United States Patent
Berger et al.

(10) Patent No.: US 8,689,639 B2
(45) Date of Patent: Apr. 8, 2014

(54) ULTRASONIC TRANSDUCER HAVING A MATCHING LAYER BETWEEN A PIEZOELECTRIC ELEMENT AND A COUPLING ELEMENT

(75) Inventors: Andreas Berger, Hasel-Glashutten (CH); Michal Bezdek, Aesch (CH); Frank Wandeler, Remingen (CH); Achim Wiest, Weil am Rhein (DE)

(73) Assignee: Endress + Hauser Flowtec AG, Reinach (CH)

( * ) Notice: Subject to any disclaimer, the term of this patent is extended or adjusted under 35 U.S.C. 154(b) by 386 days.

(21) Appl. No.: 12/735,040

(22) PCT Filed: Dec. 9, 2008

(86) PCT No.: PCT/EP2008/067054
§ 371 (c)(1),
(2), (4) Date: Jun. 11, 2010

(87) PCT Pub. No.: WO2009/077377
PCT Pub. Date: Jun. 25, 2009

(65) Prior Publication Data
US 2010/0257940 A1    Oct. 14, 2010

(30) Foreign Application Priority Data
Dec. 14, 2007   (DE) .................. 10 2007 060 989

(51) Int. Cl.
*G01F 1/66*     (2006.01)
*B06B 1/06*     (2006.01)

(52) U.S. Cl.
USPC ......... 73/861.27; 310/328; 310/334; 367/152

(58) Field of Classification Search
None
See application file for complete search history.

(56) References Cited

U.S. PATENT DOCUMENTS

| | | | | |
|---|---|---|---|---|
| 4,484,478 A | * | 11/1984 | Harkonen | 73/861.06 |
| 4,598,593 A | * | 7/1986 | Sheen et al. | 73/861.04 |
| 5,052,230 A | * | 10/1991 | Lang et al. | 73/861.28 |
| 5,251,490 A | | 10/1993 | Kronberg | |
| 5,343,109 A | * | 8/1994 | Mockl | 310/334 |
| 2004/0113522 A1 | | 6/2004 | Nagahara | |
| 2005/0236932 A1 | | 10/2005 | Nagahara | |
| 2007/0227261 A1 | * | 10/2007 | Molenaar et al. | 73/861.12 |
| 2007/0227262 A1 | * | 10/2007 | Molenaar et al. | 73/861.12 |
| 2010/0156244 A1 | * | 6/2010 | Lukacs et al. | 310/335 |
| 2012/0038248 A1 | * | 2/2012 | Mueller et al. | 310/337 |
| 2013/0140955 A1 | * | 6/2013 | Chaggares et al. | 310/334 |
| 2013/0207519 A1 | * | 8/2013 | Chaggares et al. | 310/335 |

FOREIGN PATENT DOCUMENTS

| | | | | |
|---|---|---|---|---|
| DE | 2537788 | * | 8/1977 | ............ H04R 17/00 |
| DE | 38 32 947 A1 | | 3/1990 | |
| DE | 40 28 315 A1 | | 3/1992 | |
| EP | 0 305 519 | | 3/1989 | |
| EP | 1 382 943 A1 | | 1/2004 | |
| EP | 1 477 778 A1 | | 11/2004 | |
| EP | 1 840 530 A2 | | 10/2007 | |

* cited by examiner

*Primary Examiner* — Harshad R Patel
(74) *Attorney, Agent, or Firm* — Bacon & Thomas, PLLC

(57) ABSTRACT

An ultrasonic transducer for determining and/or monitoring flow of a measured medium through a measuring tube, which includes at least one piezoelectric element, at least one coupling element and at least one adapting, or matching, layer between the piezoelectric element and coupling element. The adapting, or matching, layer has a thickness smaller than a fourth of an uneven integer multiple of a wavelength of an ultrasonic signal being used.

6 Claims, 2 Drawing Sheets

ULTRASONIC TRANSDUCER HAVING A MATCHING LAYER BETWEEN A PIEZOELECTRIC ELEMENT AND A COUPLING ELEMENT

TECHNICAL FIELD

The present invention relates to an ultrasonic transducer for determining and/or monitoring flow of a measured medium through a measuring tube. The ultrasonic transducer includes at least one piezoelectric element, at least one coupling element and at least one adapting, or matching, layer between the piezoelectric element and the coupling element.

BACKGROUND DISCUSSION

Ultrasonic-flow measuring devices are often applied in process and automation technology. They permit volume flow rate in a pipeline to be determined without contact and in simple manner.

Known ultrasonic flow measuring devices frequently work on the basis of the Doppler principle or on the basis of the travel-time difference principle.

In the case of the travel-time difference principle, the different travel times of ultrasonic pulses relative to the flow direction of the liquid are evaluated.

For this, ultrasonic pulses are sent both with as well as against the flow. From the travel-time difference, the flow velocity can be determined. In the case of a known diameter of the section of the pipeline, the volume flow rate can also be determined.

In the case of the Doppler-principle, ultrasonic waves with an ascertained frequency are coupled into the liquid, and the ultrasonic waves reflected by the liquid are evaluated. From the frequency shift between the coupled and reflected waves, the flow velocity of the liquid can likewise be determined.

Reflections in the liquid only occur, however, when small air bubbles or impurities are present, so that this principle is mainly applicable in the case of impure liquids.

The ultrasonic waves are produced or received with the assistance of so-called ultrasonic transducers. For this, ultrasonic transducers are firmly placed on the tube wall of the relevant pipeline section. More recently, clamp-on ultrasonic flow measuring systems are also obtainable. In the case of these systems, the ultrasonic transducers are pressed on the tube wall with only a clamp. Such systems are known e.g. from European Patent EP-B-686255, and U.S. Pat. No. 4,484,478 or U.S. Pat. No. 4,598,593.

A further ultrasonic flow measuring device which works on the travel-time difference principle is known from U.S. Pat. No. 5,052,230. The travel time is, in such case, ascertained by means of bursts in the form of short, sinusoidal, ultrasonic pulses.

The ultrasonic transducers normally are composed of a piezo element, also called piezo, for short, and a coupling element, also called a coupling wedge or, not so frequently, lead-in body, of synthetic material, or plastic. The ultrasonic waves are produced in the piezo element and conveyed via the coupling element to the tube wall and from there led into the liquid. Since the velocities of sound in liquids and synthetic materials, or plastics, are different, the ultrasonic waves are refracted in passing from one medium to another. The angle of refraction is ascertained in a first approximation by Snell's law. The angle of refraction is, thus, dependent on the ratio of the propagation velocities in the two media.

Between the piezoelectric element and the coupling element, an adapting, or matching, layer is arranged. The adapting, or matching, layer performs, in such case, the function of transmitting the ultrasonic signal and simultaneously the reduction of a reflection caused by different acoustic impedances at interfaces between two materials.

German Patents DE2537788A1 and DE3832947A1 describe an adapting, or matching, layer of a synthetic material filled with hollow glass spheres. This adapting, or matching, layer possesses, in such case, an impedance, which lies between the impedance of the piezoelectric element and the impedance of the measured medium. The adapting, or matching, layer possesses a thickness of a fourth of the characteristic wavelength $\lambda$ of the ultrasonic signal radiated by the piezoelectric element.

The theoretical best value of the thickness of an adapting, or matching, layer for the maximum transmission is determined by the equation $$\frac{\lambda}{4} + n * \frac{\lambda}{2}$$

with n=1, 2, 3 . . . , thus the uneven numbered multiple of a fourth of the wavelength $\lambda$ of the ultrasonic signal. Holding for the optimal matching of the impedance is $$Z_A = \sqrt{Z_P * Z_K}$$

with $Z_A$ being the impedance of the adapting, or matching, layer, $Z_P$ the impedance of the piezo and $Z_K$ the impedance of the coupling element. For an established impedances of about 30 MRayl for the piezo and about 3 MRayl for the coupling element, there results an impedance for the adapting, or matching, layer of 9 to 10 MRayl. Today, applied materials, such as glass with 11 to 14 MRayl or aluminum with about 17 Mrayl, lie relatively close to the calculated optimum.

In order for the material selection and the thickness of the adapting, or matching, layer to be less limited, a stack of many matching layers on top of one another is provided in German Patent DE4028315A1. The individual layers can have, in such case, thicknesses smaller than ¼ of the wavelength $\lambda_T$ of the transducer and different impedances. In such case, however, no resonance matching is performed. On the rear-side of the piezo, thus on the side of the piezoelectric radial oscillator facing away from the matching layers, a damping body, also called backing, is placed supplementally and attenuates the oscillation on the rear-side of the piezo. In such case, however, oscillatory energy is withdrawn, which thus cannot be used for the measuring. The composite of radial oscillator and matching layers executes a thickness oscillation, whose eigenresonance is the mentioned wavelength of the transducer. The non-resonant matching of the impedance with the matching layers smaller than ¼ of the transducer wavelength has a negligible influence on the measuring of the first three half waves of the ultrasonic transducer operated in burst mode.

In U.S. Pat. No. 5,251,490, a stack of up to twelve matching layers is likewise shown, which, however, reaches in sum the thickness of $\lambda/4$. With this stack, a resonance matching, and thus a measuring, can again occur with a packet of many consecutive oscillations.

A plurality of matching layers stacked on top of one another is also disclosed in European Patent EP0305519A1. The matching layers of synthetic material, such as polyester, and metal, such as copper, are connected with one another via a usual adhesive connection. The thicknesses of the individual layers changes stepwise from the piezo to the measurement object. A so constructed ultrasonic transducer with an adapting, or matching, layer is directly placed on the object that is to be scanned by sound. Matching to a coupling element, or even to a pipeline, is not provided.

SUMMARY OF THE INVENTION

An object of the invention is to provide an ultrasonic transducer for determining and/or monitoring flow of a measured medium through a measuring tube with high sensitivity and improved bandwidth.

The object is achieved by the feature that an ultrasonic transducer for determining and/or monitoring flow of a measured medium through a measuring tube is provided, including at least one piezoelectric element, at least one coupling element and at least one adapting, or matching, layer between the piezoelectric element and the coupling element, wherein the adapting, or matching, layer has a thickness smaller than a fourth of an uneven whole numbered multiple of a wavelength of the ultrasonic signal being used.

In an advantageous further development of the ultrasonic transducer of the invention, the thickness of the adapting, or matching, layer is smaller than a fourth of a wavelength $\lambda$ of the ultrasonic signal being used.

A damping body on the rear-side of the piezoelectric element is, thus, not absolutely required. Both the thicknesses of the individual matching layers are smaller than $\lambda/4$, as well as the sum of the thicknesses of the individual layers, thus the total thickness of the stack of the matching layers, is smaller than a fourth of an uneven whole number multiple of a wavelength of the ultrasonic signal being used. This is very surprising, since the theoretical best value of $$\frac{\lambda}{4} + n * \frac{\lambda}{2}$$

as the thickness of the adapting, or matching, layer is fallen beneath, or subceeded, according to the invention.

The adhesive layers are, conventionally, not utilized for matching, or are considered to be irrelevant. According to the invention, adhesive layers also serve as matching layers. This happens both in the case of the commonly used materials, as e.g. epoxy resin, as well as in the case of potting compounds specifically developed for this purpose. The optimum for the thickness of an adapting, or matching, layer surrounded by adhesive is shifted by the presence of the surrounding layers. The effective thickness of the adapting, or matching, layer is influenced in this way.

A plurality of thin layers lying on top of one another are considered as an oscillating total system. The layers are relatively small compared to the wavelength. The wavefront emerging from the piezo is assumed to be approximately perpendicular to the matching layers. The reflections of the ultrasound and the phase jumps associated therewith now no longer happen precisely at the boundaries of the individual layers. Also, material properties in the edge regions of the individual layers can be changed through the adhesion.

An advantageous further development of the ultrasonic transducer of the invention provides that the ultrasonic sensor has exactly one adapting, or matching, layer.

Here the adapting, or matching, layer is of a material which is suited for casting. The material is additionally suited to connect surfaces with one another by frictional bonding, thus by adhering. An individual adapting, or matching, layer of castable material has, besides the technical manufacturing advantages and the aforementioned technical process advantages, above all, mechanical advantages. Residual stresses from the manufacture are small and, through adaptable heat conductivity and coefficients of thermal expansion, stresses from temperature related expansions are reduced.

The particular potting compound for casting possesses preferably an acoustic impedance of less than 15 MRayl, especially less than 12 MRayl, especially less than 10 MRayl. At the same time, the acoustic impedance amounts to at least 2 MRayl, especially at least 5 MRayl, especially at least 7 MRayl. The impedances always depend on the selected piezoelectric element, with an impedance of preferably 25-35 MRayl, and on the coupling element, with an impedance of 1-10 MRayl, especially 2-5 MRayl. With a preferred velocity of sound in the adapting, or matching, layer of at least 2000 m/s, especially at least 2500 m/s, preferably at least 3000 m/s and a maximal velocity of sound of highest 4500 m/s, especially of maximum 4000 m/s, the velocity of sound lies preferably under 3500 m/s, there results an optimal coating thickness of, at most, $\lambda/4$. Preferably, the thickness of the single adapting, or matching, layer of castable material is at least $\lambda/6$, preferably approximately $\lambda/5$.

A very advantageous further development of the ultrasonic transducer of the invention is to be seen in the fact that the adapting, or matching, layer is of castable material.

Another advantageous further development of the ultrasonic transducer of the invention provides that spacers are arranged between the coupling element and the piezoelectric element, which produce a separation of the coupling element from the piezoelectric element, which corresponds to the thickness of the adapting, or matching, layer of the castable material.

In an additional advantageous further development of the ultrasonic transducer of the invention, it is provided that the ultrasonic sensor has three matching layers, wherein the thickness of the first adapting, or matching, layer is smaller than a fifth of an uneven integer multiple of a wavelength of the ultrasonic signal being used, wherein the thickness of the second adapting, or matching, layer is smaller than a sixth of an uneven integer multiple of a wavelength of the ultrasonic signal being used, and wherein the thickness of the third adapting, or matching, layer is smaller than a fifth of an uneven whole number multiple of a wavelength of the ultrasonic signal being used, wherein the first adapting, or matching, layer is of a castable material and connects the piezoelectric element with the second adapting, or matching, layer and wherein the third adapting, or matching, layer is of a castable material and connects the coupling element with the second adapting, or matching, layer.

In a variant of the ultrasonic transducer of the invention, it is provided that the ultrasonic sensor has three matching layers, wherein the thickness of the first adapting, or matching, layer is smaller than a fifth of a wavelength of the ultrasonic signal being used, wherein the thickness of the second adapting, or matching, layer is smaller than a sixth of a wavelength of the ultrasonic signal being used and wherein the thickness of the third adapting, or matching, layer is smaller than a fifth of a wavelength of the ultrasonic signal being used, wherein the first adapting, or matching, layer is of a castable material and connects the piezoelectric element with the second adapting, or matching, layer and wherein the third adapting, or matching, layer is of a castable material and connects the coupling element with the second adapting, or matching, layer.

The thickness of the first and the third adapting, or matching, layers is smaller than a fifth of a wavelength of the ultrasonic signal being used, especially smaller than or approximately equal to a sixth. A minimum measure of the first and the third adapting, or matching, layer of the invention is λ/16. It is especially at least λ/12 thick, especially minimally λ/10, preferably at least λ/9. The velocity of sound in the material being used in the two layers is approximately equal and amounts to between 1800 m/s and 2800 m/s. It is especially about 2300 m/s. At 5 MHz, for example, optimal layer thicknesses of 0.05 to 0.08 mm then result.

The thickness of the second adapting, or matching, layer is smaller than a sixth of a wavelength of the ultrasonic signal being used, especially smaller than a seventh. Preferably it amounts to about an eighth. It is at least λ/10 thick, especially at least λ/9. With an adapting, or matching, layer of a commonly used glass, the signal strength of the ultrasonic signal, e.g. of 5 MHz, which can be used for measurement, increases surprisingly, while thickness of the adapting, or matching, layer decreases from 0.15 mm down to 0.07 mm, for instance.

Another advantageous further development of the ultrasonic transducer of the invention provides that, between the piezoelectric element and the second adapting, or matching, layer spacers are arranged which produce a separation between the piezoelectric element and the second adapting, or matching, layer, wherein the separation corresponds to the thickness of the first adapting, or matching, layer of the castable material.

Another advantageous further development of the ultrasonic transducer of the invention is to be seen in the fact that, between the coupling element and the second adapting, or matching, layer, spacers are arranged, which produce a separation between the coupling element and the second adapting, or matching, layer, wherein the separation corresponds to the thickness of the third adapting, or matching, layer of the castable material.

In an additional advantageous further development of the ultrasonic transducer of the invention, the ultrasonic transducer is a thickness oscillator.

In the case of a sonic, or ultrasonic, transducer having a piezoceramic disk that is excitable to thickness oscillations, the operating frequency is usually the thickness resonance frequency of the piezeceramic disk, which, among other things, is determined by the dimensions of the piezeceramic disk. A piezoelectric element in the form of a thickness oscillator thus varies its thickness during sending operation. Occasionally, the oscillatable system, which, among other things, is composed of piezo element and/or adapting, or matching, layer and/or coupling element, is also referred to as a thickness oscillator. In contrast to that, an ultrasonic transducer with a piezoceramic excited to radial oscillations, usually at the radial resonance frequency of the piezo, works in the so-called radial mode.

In an additional advantageous further development of the ultrasonic transducer of the invention, the piezoelectric element oscillates for at least two oscillation periods long.

In contrast to pulse operation, where a pulse arises only from a voltage spike discharge and rapidly disappears, the piezoelectric element sends at least two complete waves, i.e. it is excited for at least two oscillations, each of one period long, or to at least one oscillation of two periods. This preferably happens by a voltage being applied to the electrodes of the piezo over a corresponding length of time. This voltage causes the piezo to execute equal frequency oscillations, i.e. periodic with the frequency of the applied, alternating voltage. Such oscillation packets lying one after the other can include a number of oscillations according to the invention.

In an additional advantageous further development of the ultrasonic transducer of the invention, the ultrasonic transducer works according to the travel-time method.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
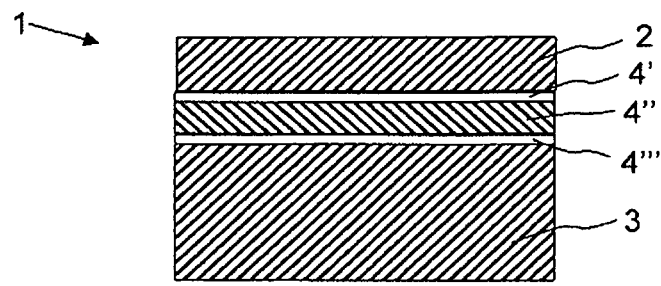
FIG. 1 is a schematic, sectional illustration of an ultrasonic transducer of the invention with a plurality of adapting, or matching, layers.

FIG. 1 shows an ultrasonic transducer 1 of the invention. It includes a piezoelectric element 2 and a coupling element 3. Between piezo 2 and coupling element 3, three matching layers 4', 4", 4'" are arranged. The matching layers 4' and 4'" are, in such case, of castable material and, for the purpose of perspicuity, are not presented here as cross-hatched. They have, in each case, a thickness of about λ/6, with λ being the wavelength of the ultrasonic radiation radiated by the piezo 2. This corresponds, for example, to a thickness of about 0.08 mm. The middle adapting, or matching, layer 4" has a thickness of approximately λ/8, e.g. 0.12 mm. The thicknesses result from the different velocities of sound in the materials. In this example of an embodiment, the mean velocity of sound in the adapting, or matching, layer 4", which is of glass or aluminum, amounts to about 5600 m/s, whereas in the matching layers 4' and 4'", for example, of an epoxy resin, mean velocities of sound of about 2300 m/s predominate. Besides the known functions of the matching of the ultrasonic signal and the mechanical matching, the matching layers 4' and 4'" undertake the task of the frictional bonding of piezo 2, lead-in body 3 and solid adapting, or matching, layer 4".

Figure 2:
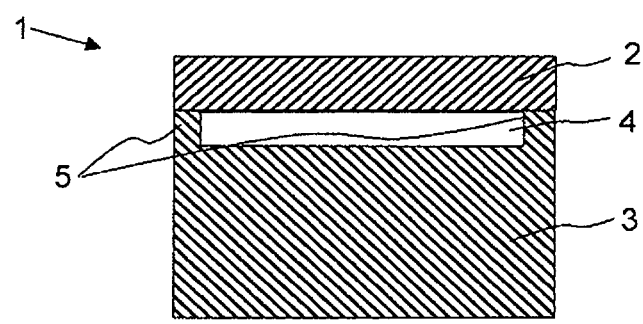
FIG. 2 is a schematic, sectional illustration of an ultrasonic transducer of the invention with an adapting, or matching, layer of castable material.

FIG. 2 shows an ultrasonic transducer of the invention 1 with only one adapting, or matching, layer 4 between piezoelectric element 2 and coupling element 3. The thickness of the adapting, or matching, layer amounts to less than λ/4 according to the invention, in this case, only λ/5, which in the case of an average velocity of sound in the adapting, or matching, layer 4 of about 3100 m/s, is about 0.12 mm. The material of the adapting, or matching, layer 4 is a material which is suitable for casting. Additionally, the material is suitable to adhere the opposing surfaces of piezo 2 and coupling element 3 with one another. The castable material in the form of potting compound, i.e. the adapting, or matching, layer 4, is not pure epoxy resin, but instead is an adhesive which has embedded pieces or particles in which sound can propagate very rapidly. Thus, there is obtained an increased speed of sound as compared to epoxy resin. A surprising feature of this arrangement is that, in spite of the theoretically good matching of the impedances by the cast adapting, or matching, layer, which has an acoustic impedance of about 8-9 MRayl, its thickness is smaller than λ/4 and nevertheless has better acoustic properties. The piezo 2 has, in this case, an acoustic impedance of about 31 MRayl and the coupling element 3 an acoustic impedance of about 3 MRayl.

Besides the improved acoustic properties and the good adhesive properties, a single adapting, or matching, layer 4 of castable material, with a coefficient of thermal expansion of about $30*10^{-6}$ $^1$/K, is also very well suited for producing a low stress connection between piezo 2 and coupling element 3, which have coefficients of expansion of about $4*10^{-6}$ $1/K$ and $60*10^{-6}$ $1/K$. An adapting, or matching, layer of glass would have had, for example, a coefficient of thermal expansion of about $8*10^{-6}$ $1/K$, while the usually applied adhesives, such as e.g. epoxy resin, have coefficients of thermal expansion of about $80*10^{-6}$ $1/K$.

The thickness of the adapting, or matching, layer can be established very exactly by means of the spacers 5. These are, for example, as shown here, placed on the coupling element 3 or are integral components of the coupling element 3. They have a defined height, which corresponds approximately to the desired thickness of the adapting, or matching, layer. The castable material is applied and the piezoelectric element 2 is set thereon. By a statistically intelligent distribution of the spacers 5 on the area of the coupling element 3 facing piezo 2, their influence on the acoustic transmission is small.

Figure 3:
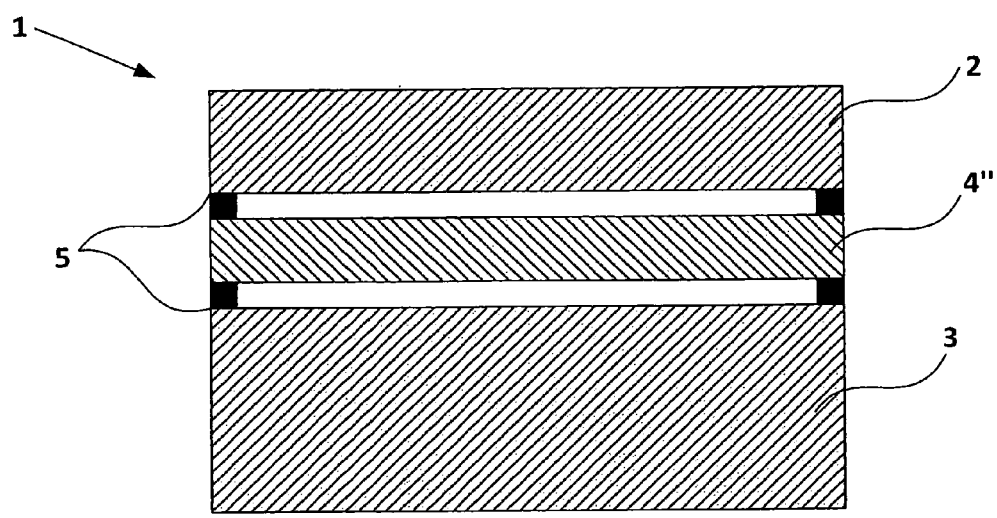
FIG. 3 is a schematic, sectional illustration of an ultrasonic transducer which shows no a final product but a step leading to the final produt of FIG. 2.

FIG. 3 shows not a final product but a step leading to the final product of FIG. 2. The layers $4^1$ and $4^{111}$ can be cast as a more or less liquid polymer material in the free space in between the spacers. The spacers are designated for the adaption of the thickness of the layers $4^1$ and $4^{111}$. They can be removed after casting or they can remain with the spacers 5.

The invention claimed is:

1. An ultrasonic transducer for determining and/or monitoring flow of a measured medium through a measuring tube, comprising:
   at least one piezoelectric element;
   at least one coupling element;
   at least one adapting, or matching, layer between said piezoelectric element and said coupling element, said at least one adapting, or matching, layer comprises a castable material; and
   spacers arranged between said at least one coupling element and said at least one piezoelectric element, which produce a separation of said at least one coupling element from said at least one piezoelectric element, which corresponds to the thickness of said at least one adapting, or matching, layer of the castable material, wherein:
   said at least one adapting, or matching, layer has a thickness smaller than a fourth of an uneven integer multiple of a wavelength of an ultrasonic signal being used.

2. The ultrasonic transducer as claimed in claim 1, wherein:
   the ultrasonic transducer has exactly one adapting, or matching, layer.

3. The ultrasonic transducer as claimed in claim 1, further comprising:
   a second adapting, or matching element; and
   spacers arranged between said at least one piezoelectric element and said second adapting, or matching, layer, which produce a separation of said at least one piezoelectric element from said second adapting, or matching, layer, wherein:
   the separation corresponds to the thickness of said first adapting, or matching, layer of the castable material.

4. The ultrasonic transducer as claimed in claim 1, further comprising:
   a second adapting, or matching element;
   a third adapting, or matching element; and
   spacers arranged between said at least one coupling element and said second adapting, or matching, layer, which produce a separation of said at least one coupling element from said second adapting, or matching, layer, wherein:
   the separation corresponds to the thickness of said third adapting, or matching, layer of the castable material.

5. The ultrasonic transducer as claimed in claim 1, wherein:
   said at least one piezoelectric element comprises a thickness oscillator.

6. The ultrasonic transducer as claimed in claims 1, wherein:
   said at least one piezoelectric element oscillates for at least two oscillation periods.

* * * * *